(12) United States Patent
Gerber et al.

(10) Patent No.: US 7,568,503 B2
(45) Date of Patent: Aug. 4, 2009

(54) COMPRESSOR THROTTLING VALVE ASSEMBLY

(75) Inventors: Thomas E. Gerber, Williamsville, NY (US); Mark R. Sabin, Sanborn, NY (US)

(73) Assignee: Cameron International Corporation, Houston, TX (US)

( * ) Notice: Subject to any disclaimer, the term of this patent is extended or adjusted under 35 U.S.C. 154(b) by 540 days.

(21) Appl. No.: 11/200,613

(22) Filed: Aug. 10, 2005

(65) Prior Publication Data

US 2007/0034257 A1 Feb. 15, 2007

(51) Int. Cl.
*F16K 39/00* (2006.01)
(52) U.S. Cl. .................. 137/637.2; 137/240; 137/637.4
(58) Field of Classification Search .................. 137/240, 137/637, 637.1, 637.2, 637.3, 637.4, 637.5
See application file for complete search history.

(56) References Cited

U.S. PATENT DOCUMENTS

| 4,545,742 | A | * | 10/1985 | Schaefer | 417/366 |
| 4,662,190 | A | * | 5/1987 | Tischer | 62/470 |
| 6,453,658 | B1 | * | 9/2002 | Willis et al. | 60/804 |

* cited by examiner

*Primary Examiner*—Kevin L Lee
(74) *Attorney, Agent, or Firm*—Fletcher Yoder

(57) ABSTRACT

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

22 Claims, 4 Drawing Sheets

COMPRESSOR THROTTLING VALVE ASSEMBLY

FIELD OF THE INVENTION

The field of this invention is throttling valves and more particularly those used on centrifugal compressors to match output to system demands.

BACKGROUND OF THE INVENTION

Centrifugal compressors are frequently packaged in multiple stages using a common drive including associated controls. One type of control involved throttling the suction to the initial stage so as to match the output of the compressor to the system demands. Doing this avoids the cost of energy to power the compressor units at output levels not required from the system. The nature of the performance curve of centrifugal compressors is that their output flow and pressure are related and can be varied by a throttling assembly typically mounted at the suction to the first stage. These throttling assemblies have been designed in the past using a series of blades that rotate 90 degrees between the open and closed position. Typically each blade has a pair of end shafts that extend out of the inlet piping going to the first stage. Each such shaft extension through the piping system was provided with a shaft seal and a purge system. The purpose of the purge system was to keep gasses from escaping these shaft seals particularly in applications where inlet pressures in a particular system ran normally at elevated pressures that were raised to an even higher pressure by the compressor system. The purge system served a purpose of avoiding sucking in surrounding air in some systems. In conditions of high turndown when the blades are operating close to the fully closed position, it was possible for the compressor to draw the pressure down to negative values. In those cases, in order to avoid drawing air into the process gas being compressed, the process gas was hooked to the purge system. If a negative pressure situation occurred, the process gas would be sucked in around shaft seals located at each end of each blade. Depending on the inlet piping size, there could be several blades rotating in tandem with each one having a connection to the purge system.

The blades each had a dedicated linkage typically connected to a rotating ring that was turned by an actuator, typically operated by pneumatic pressure.

The problems with the prior design were numerous. As mentioned above there was the concern of leakage at every shaft seal of every blade and the need to hook up a purge system to each potentially leaking seal. The present invention eliminates the concerns of the previous designs by enclosing the inlet pipe with the blades inside in a surrounding housing. In this approach the leakage at blade shaft seals becomes irrelevant as a surrounding housing contains the process gas. The design further extends a balanced driving piston that is powered by the external pneumatic actuator into the interior of the housing. Balancing the piston reduces actuator output requirements be eliminating internal housing pressure as a load on the drive stem. Multiple seals are available on the drive stem penetrations of the housing to further enhance reliable operation. One or more internal passages remain open between the upstream and downstream sections of the housing on either side of the blades. Thus, when high turndowns with nearly closed blades bring the downstream pressure down to negative values due to continuing compressor operation, the passages serve an equalization function to avoid sucking air into the housing. These and other features of the present invention will be more readily understood from a review of the description and drawings of the preferred embodiment and the claims, which appear below.

SUMMARY OF THE INVENTION

A throttling valve assembly has an outer housing that is sealed. An actuator is connected to a pressure balanced shaft that extends into the housing to operate a plurality of linkages that can rotate blades in tandem. With the surrounding housing sealed, the shaft penetrations of the blade support shafts no longer need seals or a purge system to supply process gas during times of reduced pressure in situations with the blades nearly closed. A pressure equalization system has balance passages internal to the housing to allow flow from higher pressure zones to lower pressure zone of the process gas so as to avoid creation of a condition that can draw air into any zones of reduced pressure in the housing.

DETAILED DESCRIPTION OF THE PREFERRED EMBODIMENT

Figure 1:
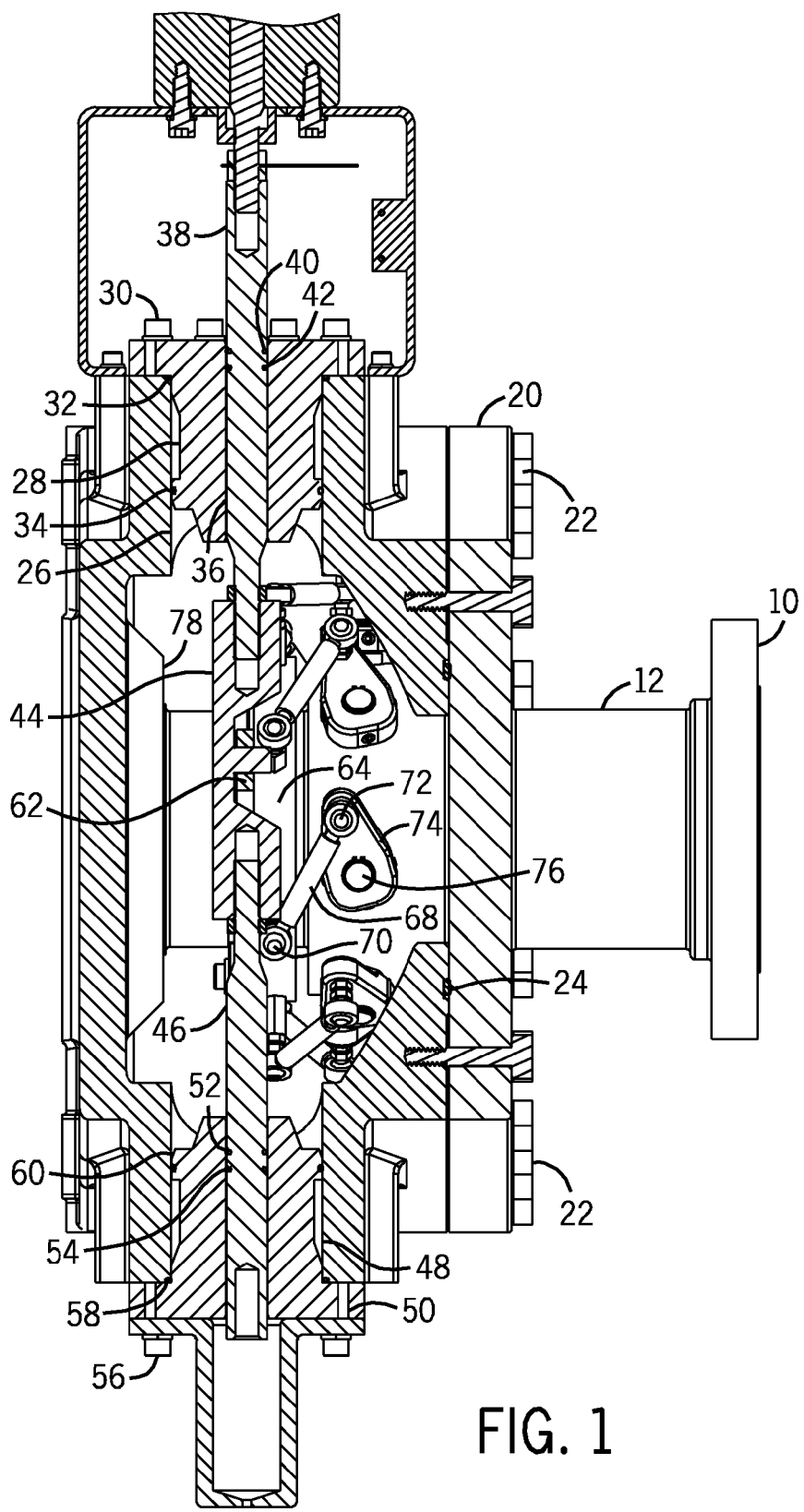
FIG. 1 is a section view through the outer housing showing the shaft and linkage system that it operates.
Figure 4:
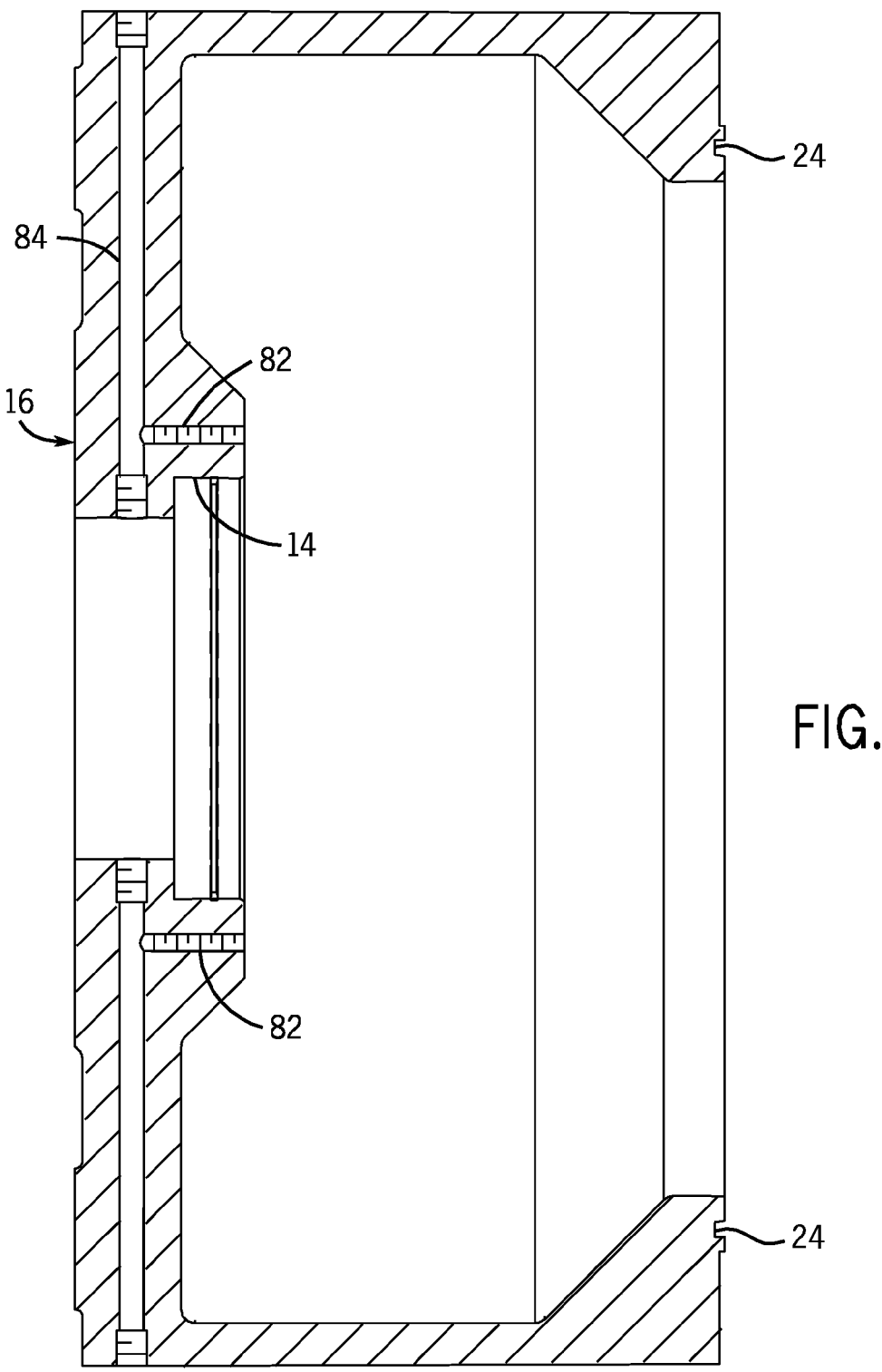
FIG. 4 is a section view through the outer housing.

Referring to FIG. 1 a compressor system (not shown) has its inlet attached at flange 10. Flange 10 is connected to inner housing 12 which is essentially a section of pipe that extends into a recess 14 (see FIGS. 2 and 4) of outer housing 16 and is sealed to said recess 14 with a seal 18. Attached to inner housing 12 is a flange 20 which is secured to outer housing 16 by bolts 22. A seal 24 seals the flange 20 to the outer housing 16. Outer housing 16 has an upper opening 26 which is closed off by a plug 28 secured in a sealing relationship due to bolts 30 and seals 32 and 34. A bore 36 accepts upper rod 38 which can translate in the bore 36 while being sealed to it by redundant seals 40 and 42. A connector 44 attaches lower rod 46 to upper rod 38. Opening 48 is opposed to opening 26 and accepts a plug 50 through which the lower rod 46 translates while in a sealed relationship due to redundant seals 52 and 54. Plug 50 is retained in a sealing relation to the outer housing 16 by use of bolts 56 and seals 58 and 60.

Figure 2:
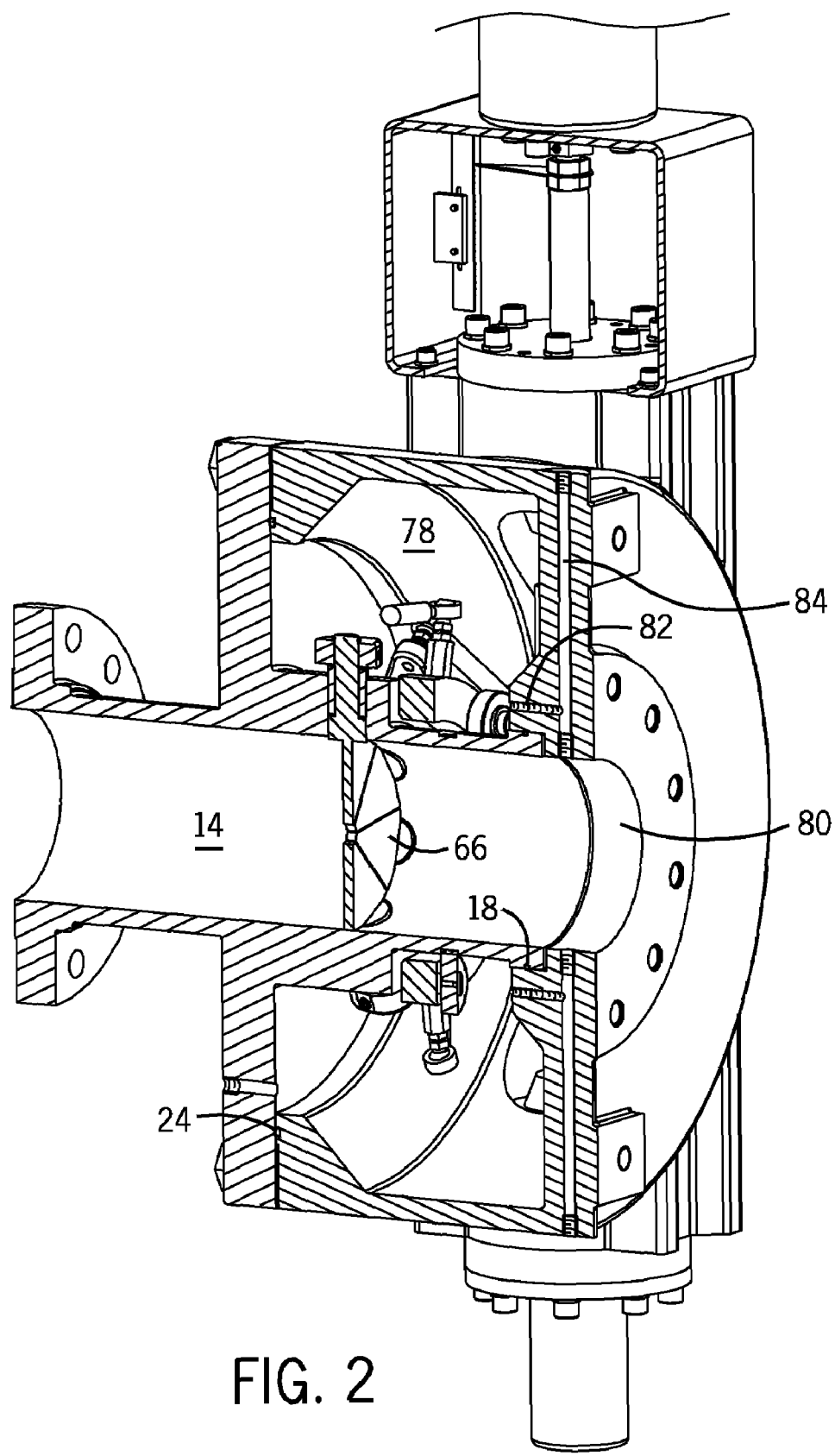
FIG. 2 is a section through both outer and inner housings showing the blades.
Figure 3:
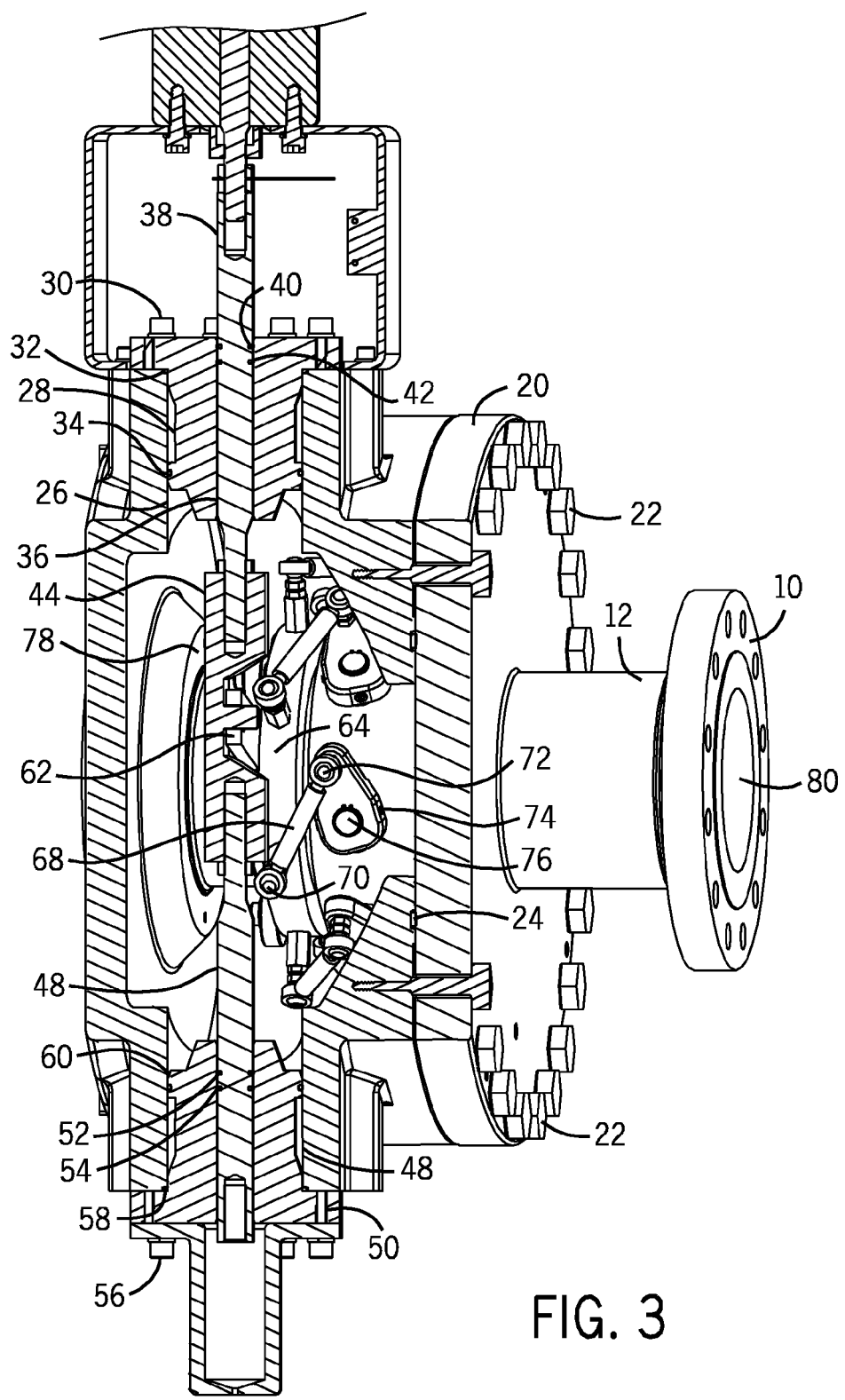
FIG. 3 is another section showing the manner the linkages are operated in tandem by the shaft.

Connector 44 is engaged to an arm 62 that extends radially from ring 64. Translation of connector 44 results in rotation of ring 64. Each blade 66 shown in FIG. 2 is connected to a linkage that comprises a link 68 pinned at 70 to ring 64 and pinned at 72 to link 74. Shaft 76 is rotated with link 74 and the blade 66 turns when shaft 76 turns. All shafts 76 are designed to rotate in tandem to operate each blade 66 in tandem and uniformly. FIG. 2 shows the blades 66 in the closed position.

The extensions of shafts 76 through inner housing 12 are no longer needed to be sealed as in the prior art. This is because there is an outer housing 16 that has its orifices sealed with flange 20, plug 28 and plug 50.

An annular space 78 is created between outer housing 16 and inner housing 12. Outer housing 16 has an upstream inlet 80 that leads to the blades 66 in the inner housing 12. Pressure in inlet 80 communicates through passage 82 into the annular space 78. That way when the blades 66 go toward the closed position reducing the pressure in the inner housing 12 near flange 10 gasses from annular space 78 flows around shafts 76 so that outside air is not drawn into the inner housing 12. Passage 84 is provided and can be blanked off on outer housing 16. Alternatively, a purge system that can deliver process gas into annular space 78 may still be wanted by some users and they can use passage 84 for that very purpose.

Those skilled in the art will appreciate that the pressure balanced design of upper rod 38 and lower rod 46 makes the driving assembly insensitive to annular space 78 pressure. The redundancy of seals such as 40 and 42 means more hours of reliable operation and less downtime. The pressure balanced design allows the use of a smaller actuator connected to upper rod 38. The pressure equalizing system has no moving parts and equalizes pressure differentials induced by reorientation of the blades 66 fairly fast. The design eliminates shaft seals on the rotating blade or blades 66. The two piece design of the outer housing 16 facilitates maintenance and assembly operations. Seals on rods 38 and 46 can be changed without taking the housing 16 out of the suction piping system to the compressor. Thrust loads on the shafts 76 are reduced if not eliminated since annular space 78 and inner housing 12 quickly equalize to a common pressure upstream of the blades 66.

While the preferred embodiment has been set forth above, those skilled in art will appreciate that the scope of the invention is significantly broader and as outlined in the claims which appear below.

We claim:

1. A control device for a compressor, comprising:
an inner housing connected for flow communication to the compressor, the inner housing comprising a valve member having at least one operating shaft extending through the inner housing, wherein the operating shaft is not sealed as it extends through the inner housing; and
an outer housing sealingly surrounding the inner housing.

2. The control device of claim 1, comprising:
a higher pressure zone and a lower pressure zone; and
a pressure equalizing device between the higher and lower pressure zones.

3. The control device of claim 1, further comprising:
an operating rod extending into the outer housing in a pressure balanced configuration for operating the operating shaft of the valve member.

4. The control device of claim 2, wherein:
the pressure equalizing device comprises a passage linking the higher pressure zone within the inner housing to an annular space between the inner and outer housings.

5. The control device of claim 1, wherein:
the inner housing is formed to also serve as a closure for the outer housing while defining an annular space therebetween.

6. The control device of claim 3, wherein:
the operating rod makes two opposed penetrations of the outer housing, the penetrations sealed by redundant seals.

7. The control device of claim 3, wherein:
portions of the operating rod exposed within the outer housing present a symmetrical configuration to obtain the pressure balance aspect of the operating rod.

8. The control device of claim 4, wherein:
the passage extends in a wall of the outer housing.

9. The control device of claim 4, wherein:
the passage extends to an exterior of the outer housing to allow connection to a source of purge gas to the annular space.

10. A control device for a compressor, comprising:
an inner housing connected for flow communication to the compressor, the inner housing comprising a valve member having at least one operating shaft extending therethrough; and
an outer housing sealingly surrounding the inner housing;
wherein the inner housing is formed to also serve as a closure for the outer housing while defining an annular space therebetween.

11. The control device of claim 10, wherein:
a higher pressure zone and a lower pressure zone; and
a pressure equalizing device between the higher and lower pressure zones.

12. The control device of claim 11, wherein:
the pressure equalizing device comprises a passage linking the higher pressure zone within the inner housing to the annular space.

13. The control device of claim 12, wherein:
the passage extends in a wall of the outer housing.

14. The control device of claim 12, wherein:
the passage extends to an exterior of the outer housing to enable connection to a source of purge gas to the annular space.

15. The control device of claim 10, further comprising:
an operating rod extending into the outer housing in a pressure balanced configuration for operating the operating shaft of the valve member.

16. The control device of claim 15, wherein:
the operating rod makes two opposed penetrations of the outer housing, the penetrations sealed by redundant seals.

17. The control device of claim 15, wherein:
portions of the operating rod exposed within the outer housing present a symmetrical configuration to obtain the pressure balance aspect of the operating rod.

18. The control device of claim 10, wherein the operating shaft is not sealed as it extends through the inner housing.

19. A control device for a compressor, comprising:
an outer housing;
an inner housing sealingly surrounded by the outer housing and connected for flow communication to the compressor;
a valve member having at least one operating shaft extending through the inner housing, wherein the operating shaft is not sealed as it extends through the inner housing;
a higher pressure zone and a lower pressure zone;
a pressure equalizing device between the higher and lower pressure zones; and
an operating rod extending into the outer housing in a pressure balanced configuration for operating the operating shaft of the valve member.

20. The control device of claim 19, wherein:
the pressure equalizing device comprises a passage linking the higher pressure zone within the inner housing to an annular space between the inner and outer housings.

21. The control device of claim 20, wherein:
the passage extends to an exterior of the outer housing to allow connection to a source of purge gas to the annular space.

22. The control device of claim 19, wherein:
the operating rod makes two opposed penetrations of the outer housing, the penetrations sealed by redundant seals.

* * * * *

UNITED STATES PATENT AND TRADEMARK OFFICE
CERTIFICATE OF CORRECTION

PATENT NO. : 7,568,503 B2 Page 1 of 1
APPLICATION NO. : 11/200613
DATED : August 4, 2009
INVENTOR(S) : Gerber et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 899 days.

Signed and Sealed this

Seventh Day of September, 2010

David J. Kappos
*Director of the United States Patent and Trademark Office*